US009798928B2

(12) United States Patent
Carr et al.

(10) Patent No.: US 9,798,928 B2
(45) Date of Patent: Oct. 24, 2017

(54) SYSTEM FOR COLLECTING AND PROCESSING AERIAL IMAGERY WITH ENHANCED 3D AND NIR IMAGING CAPABILITY

(71) Applicants: James L Carr, Washington, DC (US); Stephen J Fujikawa, Gambrills, MD (US); Lawrence A Herron, Jr., Graham, NC (US); Nathaniel F Allen, Laurel, MD (US); Joseph R Fox-Rabinovitz, Laurel, MD (US)

(72) Inventors: James L Carr, Washington, DC (US); Stephen J Fujikawa, Gambrills, MD (US); Lawrence A Herron, Jr., Graham, NC (US); Nathaniel F Allen, Laurel, MD (US); Joseph R Fox-Rabinovitz, Laurel, MD (US)

( * ) Notice: Subject to any disclaimer, the term of this patent is extended or adjusted under 35 U.S.C. 154(b) by 497 days.

(21) Appl. No.: 14/332,749

(22) Filed: Jul. 16, 2014

(65) Prior Publication Data
US 2015/0022656 A1    Jan. 22, 2015

Related U.S. Application Data

(60) Provisional application No. 61/847,297, filed on Jul. 17, 2013.

(51) Int. Cl.
*G06K 9/03*    (2006.01)
*G06K 9/34*    (2006.01)
*G06K 9/00*    (2006.01)
*G01C 11/02*   (2006.01)

(52) U.S. Cl.
CPC .......... *G06K 9/0063* (2013.01); *G01C 11/025* (2013.01); *G06K 9/00657* (2013.01)

(58) Field of Classification Search
CPC . G06K 9/0063; G06K 9/00657; G01C 11/025
See application file for complete search history.

(56) References Cited

U.S. PATENT DOCUMENTS

| 5,724,496 | A  | * | 3/1998  | Givens ........................ G06T 7/32 345/440 |
| 7,333,725 | B1 | * | 2/2008  | Frazier ................... G03B 31/04 348/207.99 |
| 7,555,297 | B2 | * | 6/2009  | Hibbs ................ H04B 7/18504 342/355 |
| 7,561,037 | B1 | * | 7/2009  | Monroe ................. H04N 7/181 340/3.1 |
| 7,587,260 | B2 | * | 9/2009  | Bruemmer ........... G05D 1/0088 318/567 |
| 7,860,302 | B2 | * | 12/2010 | Sato .......................... G06T 7/74 382/154 |
| 7,911,517 | B1 | * | 3/2011  | Hunt, Jr. .............. G06K 9/0063 348/272 |

(Continued)

*Primary Examiner* — Sath V Perungavoor
*Assistant Examiner* — Philip Dang
(74) *Attorney, Agent, or Firm* — Baker Donelson, PC; Royal W. Craig

(57) ABSTRACT

A system for guided geospatial image capture, registration and 2D or 3D mosaicking, that employs automated imagery processing and cutting-edge airborne image mapping technologies for generation of geo-referenced Orthomosaics and Digital Elevation Models from aerial images obtained by UAVs and/or manned aircraft.

27 Claims, 9 Drawing Sheets

(56) References Cited

U.S. PATENT DOCUMENTS

| | | | | |
|---|---|---|---|---|
| 8,315,477 B2* | 11/2012 | Acree | ............... | G01C 11/00 348/61 |
| 2004/0213345 A1* | 10/2004 | Holcomb | ............. | H04N 19/527 375/240.03 |
| 2008/0247462 A1* | 10/2008 | Demos | ................ | H04N 19/597 375/240.03 |
| 2009/0161946 A1* | 6/2009 | Sato | .................. | G06T 7/74 382/154 |
| 2009/0256909 A1* | 10/2009 | Nixon | ................ | B64D 47/08 348/144 |
| 2010/0066750 A1* | 3/2010 | Yu | ..................... | H04L 67/38 345/581 |
| 2011/0235799 A1* | 9/2011 | Sovio | ................ | H04L 9/083 380/30 |
| 2011/0238985 A1* | 9/2011 | Sovio | ............... | H04N 21/2347 713/168 |
| 2012/0042263 A1* | 2/2012 | Rapaport | ............. | G06Q 50/01 715/753 |
| 2012/0215829 A1* | 8/2012 | Naphade | ............ | G06N 99/005 709/203 |
| 2012/0274505 A1* | 11/2012 | Pritt | .................. | G01S 13/9035 342/25 A |
| 2013/0013185 A1* | 1/2013 | Smitherman | ........ | G01C 11/025 701/409 |
| 2013/0077891 A1* | 3/2013 | Nimnual | ............. | G06T 7/37 382/276 |
| 2013/0086116 A1* | 4/2013 | Agarwal | ............. | G06F 7/00 707/792 |

* cited by examiner

SYSTEM FOR COLLECTING AND PROCESSING AERIAL IMAGERY WITH ENHANCED 3D AND NIR IMAGING CAPABILITY

CROSS-REFERENCE TO RELATED APPLICATION(S)

The present application derives priority from U.S. provisional application Ser. No. 61/847,297 filed 17 Jul. 2013.

BACKGROUND OF THE INVENTION

1. Field of the Invention

The present invention relates generally to airborne mapping systems and methods and, more particularly, to a system for collecting, processing, displaying, and exploiting aerial imagery with enhanced Three-Dimensional (3D) & Near-Infra Red (NIR) imaging capability.

2. Description of the Background

Aerial photography involves taking photographs of the ground from an airborne platform, typically from camera(s) mounted on aircraft. Aerial photography is commonly used in cartography, including photogrammetric surveys. The typical process employs flying a pattern over a defined area and using one or more cameras on the aircraft to take periodic photos, which are later merged into a completed mosaic aerial survey of the entire area. Aerial photography mosaics have been useful for decades, and there have been many efforts to automate the collection process dating to before the advent of digital photography. For example, European Patent EP0053640 by Fujimoto (Interval Eizo Yugen Kaisha) filed Dec. 4, 1980 discloses a computerized control for aerial film photography that automatically triggers the camera shutters to ensure full coverage of the area being photographed. The inputs to the computer are of aircraft speed, altitude, percentage overlap between successive pictures, and lens angle.

Most airborne imaging platforms are still very expensive, require significant lead-time, stabilized camera gimbals and/or Inertial Measurement Units (IMUs), and still lack the spatial resolution for resolving small features. However, digital cameras have evolved and it is now possible to acquire large-scale imagery with inexpensive consumer-grade equipment, at a significantly lower cost, and a higher spatial resolution. Digital photography also made it possible to mosaic images based on common features in the images. For example, United States Patent Application 20050063608 by Clarke et al. (Epson) published Mar. 24, 2005 shows a system and method for creating a panorama image from a plurality of source images by registering adjoining pairs of images in the series based on common features.

With the subsequent advent of GPS positioning, it became possible to georeference images to ground coordinates. Multiple ground images could be mosaicked into a wide area image based on geotagged GPS coordinates in each image and thereby registered onto a uniform "orthophotograph", an aerial photograph geometrically corrected or "orthorectified" such that the scale is uniform. Unfortunately, GPS coordinates alone do not provide sufficient accuracy. More information is needed. Indeed, in order to form a precise registration of images it is also necessary to adjust the individual images for topographic relief, lens distortion, camera tilt, etc. An orthophotograph includes such adjustments and can be used to measure true distances as if on a map. U.S. Pat. No. 7,639,897 to Gennetten et al. (Hewlett Packard) issued Dec. 29, 2009 shows an airborne imaging system in which a camera is swept once over a field of view to construct a video mosaic which is used to select settings for focus, exposure, or both to be used and to compute the number and locations of a set of component photographs that will tile the scene. The system then guides the user to sweep field of view of the camera over the scene a second time, visiting each component photograph location.

Orthophotographs are commonly used by a Geographic Information Systems (GIS), which provides a foundation for photogrammetric analyses of the aerial photographs. Photogrammetry is used in different fields, such as topographic mapping, architecture, engineering, manufacturing, quality control, police investigation, and geology. Orthophotographs can be registered to a two-dimensional scale, or in three dimensions. For example, U.S. Pat. No. 7,751,651 to Oldroyd (Boeing) issued Jul. 6, 2010 shows a processing architecture where a camera image is registered with a synthetic 3D model of a scene by combining a geocoded reference Digital Elevation Model (DEM) and a geocoded reference image such that each pixel of the geocoded reference image is associated with an elevation from the DEM. United States Patent Application 20120105581 to Berestov (Sony) published May 3, 2012 shows a method for converting two dimensional images to three dimensional images using Global Positioning System (GPS) data and Digital Surface Models (DSMs). The DSMs and GPS data are used to position a virtual camera. The distance between the virtual camera and the DSM is used to reconstruct a depth map. The depth map and two dimensional image are used to render a three dimensional image.

Multispectral and hyperspectral imaging sensors are able to view different bands in various regions of the electromagnetic spectrum. For example, U.S. Pat. No. 5,999,650 to Ligon issued Dec. 7, 1999 shows a system for generating color images of the Earth's surface based on its measured red and near infra-red radiation. The system classifies each area of land based on satellite-measured red and near-infrared radiation from each area of the land, then associates a color with each land class, and finally colors the image pixel corresponding to each area of the land with the color associated with its class. Multispectral and hyperspectral imaging are especially useful in diagnosing crop health.

A more sophisticated 3D imaging technique, called stereophotogrammetry, involves estimating the three-dimensional coordinates of points on an object. These are determined by measurements made in two or more photographic images taken from different positions. U.S. Pat. No. 5,606,627 to Kuo (Eotek Inc.) issued Feb. 25, 1997 discloses an automated analytic stereo comparator that extracts elevation data from a pair of stereo images with two corresponding sets of airborne control data associated with each image of the stereo image pair. The topographic elevation of each feature is derived from object-space parallax, a base length, and the altitude of a camera station. U.S. Pat. No. 7,508,972 to Maruya (NEC) issued Mar. 24, 2009 shows topographic measurement using stereoscopic picture frames. The picture frames are combined to produce a number of pairs of frames which constitute a stereoscopic image of the target area. Each frame pair is analyzed according to a number of visual characteristics and evaluated with a set of fitness values representative of the degrees of fitness of the frame pair to topographic measurement of the target area. A total of the fitness values is obtained from each frame pair and compared with the total values of other frame pairs. A parallax between the best pair frames is determined to produce first and second sets of line-of-sight vectors for conversion to topographic data.

Aerial photography has proven especially useful for monitoring growth and development of crops and obtaining early estimates of final crop yield. With the use of near infrared aerial photographs, plant physiological and morphological differences can be distinguished within fields and areas of possible plant disease can be identified. Crop Producers can evaluate site-specific yield potential, irrigation efficiency, nitrogen levels and seeding, and can generally improve profitability through yield increases and material savings. Stereophotogrammetry enables further exploitation by providing information about the heights of objects standing off the ground. Such data is useful in all application fields, including agriculture, forestry, mapping and surveying.

Despite piecemeal technology advancements as described above, there remains a need for a turnkey system for guided geospatial image capture from Unmanned Aerial Vehicles (UAVs) and/or manned aircraft, registration and mosaicking, that employs low cost hardware and is highly automated, and that generates geo-referenced Orthomosaics to be rendered in two or three dimensions with the attendant capability to measure the heights of objects.

SUMMARY OF THE INVENTION

It is an object of the invention to provide a system to collect and process large-scale imagery with inexpensive consumer-grade equipment, without the use of an IMU, at a significantly lower cost, and a higher spatial resolution.

Another object of the invention is to provide a system to mosaic the imagery based on a unique computer processing algorithm which allows unambiguous geolocation of each pixel to high accuracy.

Another object is to provide a system capable of generating uniquely processed NIR imagery for diagnosis of plant health.

It is another object to provide a system for displaying 3D data from the collected and processed imagery, and to measure the height of objects for aerial surveying and other purposes.

Another object of the present invention is to provide a cloud-based Software as a Service (SaaS) system that allows UAV or manned aircraft pilots to upload and manage the processing of their imagery over the internet.

These and other objects are achieved by a system for processing aerial imagery with enhanced 3D & NIR imaging capability. The system payload consists of either one or two consumer market digital single lens reflex cameras, one being modified for acquisition of Near-Infrared (NIR) imagery as per U.S. Pat. No. 7,911,517, plus an avionics box, GPS receiver, and tablet PC, but without an IMU. A pilot interface display on the tablet PC maps the plane as it flies a raster pattern across a predetermined geographic area. The avionics box triggers the camera(s) to collect photos with significant overlap along each raster. Triggering is automatically made at the time of a GPS top of second to insure that the position of the picture is precisely synchronized with the GPS position. When a picture is taken, the avionics box notes the trigger time and the GPS position and transmits it to the tablet PC for logging. Triggering is automatically suppressed after completing a raster and flying outside of the collection area, after which the pilot breaks off the flight line, turns around, and heads into the next raster. Triggering interval is adjustable in multiples of 1.0 sec to provide required overlap at differing flight speeds and altitudes but always occurs at the GPS top of second. The rasters are oriented in flight so that the direction of flight is either towards or away from the sun in accordance with the time of the collect. This improves tile boundary continuity in the mosaics as there is generally a strong dependence on reflected light intensity according to whether sunlight is reflected towards the camera(s) in the forward-scatter or away from the camera(s) in the back-scatter geometry. A large overlap along a raster allows multiple pixels from a plurality of images to represent the same point on the ground and thereby sample diverse sun-aircraft-camera scattering geometries. Tile boundary effects are mitigated by choosing tile boundaries so as to minimize the change in scattering geometry across boundaries. But more generally, the diversity in scattering geometry provides for a richer description of the scene under collection.

The pilot, after landing the plane, uploads a flight log recording the shutter times and the GPS positions of the aircraft during flight, and all of the photos to an FTP site. The next step is to register all the imagery to the Earth, which entails remapping all of the photos into a common frame of reference. This process begins with automated image-to-image tie point registration between pairs of overlapping photos (generally, the identification of many image tie-points (ITPs), followed by a calculation transforming one image's pixel coordinates into the coordinate space of the other image, followed by a resampling based on that transformation from which a small template (or "chip") is extracted, and followed by cross correlation to match the feature represented in the chip to a location in the other image). Tie-point registration is sequenced along rasters and between rasters in accord with the distance between aircraft positions. An accelerated normalized cross correlation method is used with a multi-resolution matching method that degrades the resolution by binning pixels. Binning hides changes in the appearance of 3D objects due to parallax to allow effective pattern matching at the finest possible resolution. Once all of the photos in the collect are linked by image tie points (ITPs), the software estimates a set of previously unknown parameters that describe the orientation of the aircraft and properties of the camera optics such as focal length and distortion, and all of the photos are remapped into a common frame of reference in accord with these parameters. The system then takes a raster of remapped photos and determines the overlaps between successive images. Overlapping pairs of successive images (stereo pairs) are rendered for the left and right eyes using 3D enabled graphical display technology to present the user with a 3D mosaic. The parallax between stereo pairs gives the height above the Digital Elevation Model used in the remapping step. One can visualize and measure heights of objects from the residual parallax observed in the 3D mosaic. Either 2D or 3D mosaics can be converted into Normalized Differential Vegetation Index (NDVI) products to measure plant cover and plant health.

The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts. The exemplary embodiment will be described in the context of a system for processing aerial imagery with enhanced 3D & NIR imaging capability especially for crop management, but those skilled in the art will recognize that the teachings of the exemplary embodiment can be applied to other applications including aerial surveying.

Image Collection

The present solution offers a semi-automated image collection process, which begins with the planning of a collect over an area of interest. The area of interest may be defined by one or more Environmental Systems Research Institute (ESRI) shape files that circumscribe the area of interest, or by a defined geographic location or other point of reference in combination with a desired radius or distance from this point. A pilot is engaged to fly the collect and is provided with a flight plan in the form of a collection box to overfly containing the area of interest. In many cases, several collects are planned for one flight and the pilot flies from one collection box to the next. The collect flight is computer-guided and image acquisition is automated as described below.

Airborne Payload

The payload requires a GPS receiver, but otherwise no inertial measurement capabilities or IMU, and is well suited for flight in a manned general aviation aircraft or a UAV.

At least one and preferably two payload cameras are mounted inside the aircraft and pointed out of an optical port in the floor, or alternatively mounted externally in pods specially designed to accommodate cameras on planes lacking optical ports. The payload camera may comprise either a consumer market digital single lens reflex camera, a Near-Infrared (NIR) camera, and/or a consumer SLR modified for acquisition of NIR imagery.

Figure 1:
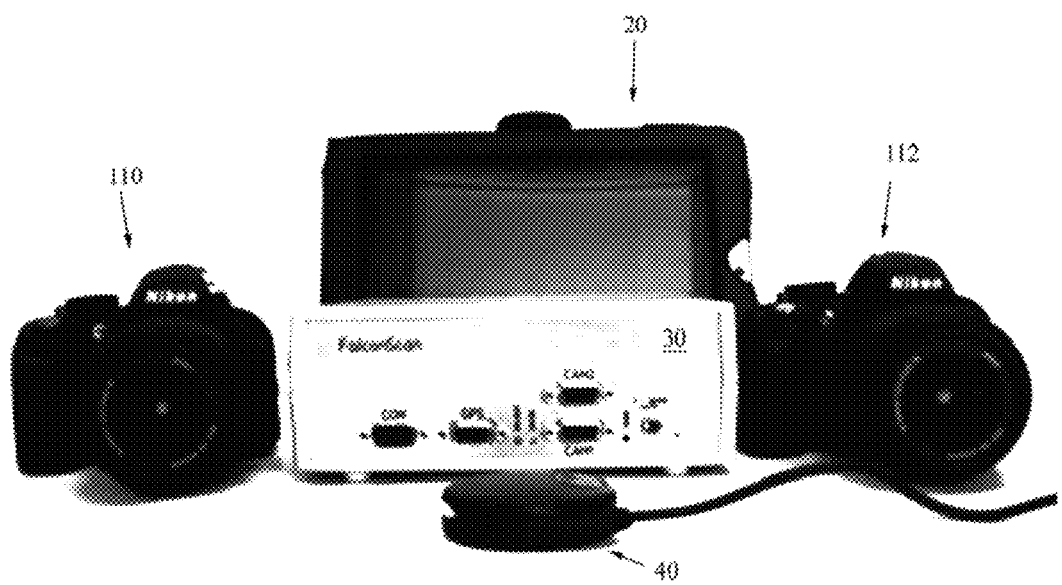
FIG. 1 is a perspective illustration of an exemplary two camera airborne imaging payload.

FIG. 1 illustrates an exemplary two camera airborne imaging payload. Camera 110 is a consumer grade digital single lens reflex camera such as a Nikon™ D5100 16.2MP CMOS Digital SLR Camera with 18-55 mm f/3.5-5.6 AF-S DX VR Nikkor™ zoom lens. Camera 112 is a comparable camera for Near-Infrared (NIR) imagery, and indeed may be an identical camera to the first that has been modified for acquisition of NIR as set forth in U.S. Pat. No. 7,911,517 to Hunt et al. issued Mar. 22, 2011. In addition, a standard GPS Receiver 40 is used, and this may be any consumer or OEM receiver with a serial output, such as a Garmin GPS-35LVC™ GR-213U GPS Receiver. The cameras 110, 112 and GPS receiver 40 are connected to an avionics box 30 which is in turn connected to a tablet PC 20 (or laptop PC). The tablet PC 20 runs pilot interface software for guiding the collect over the area of interest based on the GPS 40 data.

Figure 2:
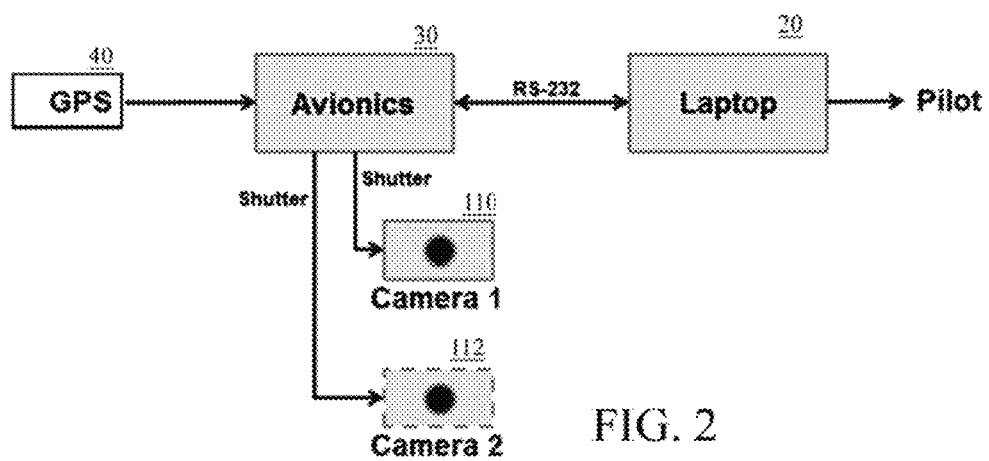
FIG. 2 is a block diagram of the payload of FIG. 1.

FIG. 2 is a block diagram of the payload of FIG. 1. The avionics box 30 contains a microprocessor that runs a firmware program to record the GPS 40 time and position once each second (GPS top-of-second) and communicates this data to the tablet PC 20 (or laptop) in serial messages sent over an RS-232 or other digital interface. The tablet PC 20 uses these messages to drive the pilot's display and to record a flight log. Whenever the plane is within the collection box, the flight control software on the tablet PC 20 sends a serial command to the avionics box 30 to enable camera triggers. The avionics box 30 includes a counter that increments with each top-of-second GPS pulse, and when the counter reaches a preset value, the camera(s) 110, 112 are triggered, a photo is taken, and the counter resets. User controls are provided at the tablet PC 20 to program the number of seconds between photos.

In operation, the laptop 20 guides the pilot to fly the collection plan to collect imagery over a large collect area, while the avionics box 20 controls the cameras 110, 112 and furnishes telemetry from GPS 40 including time, latitude and longitude of each photo for guidance and post-flight processing.

Guided Collect

Figure 3:
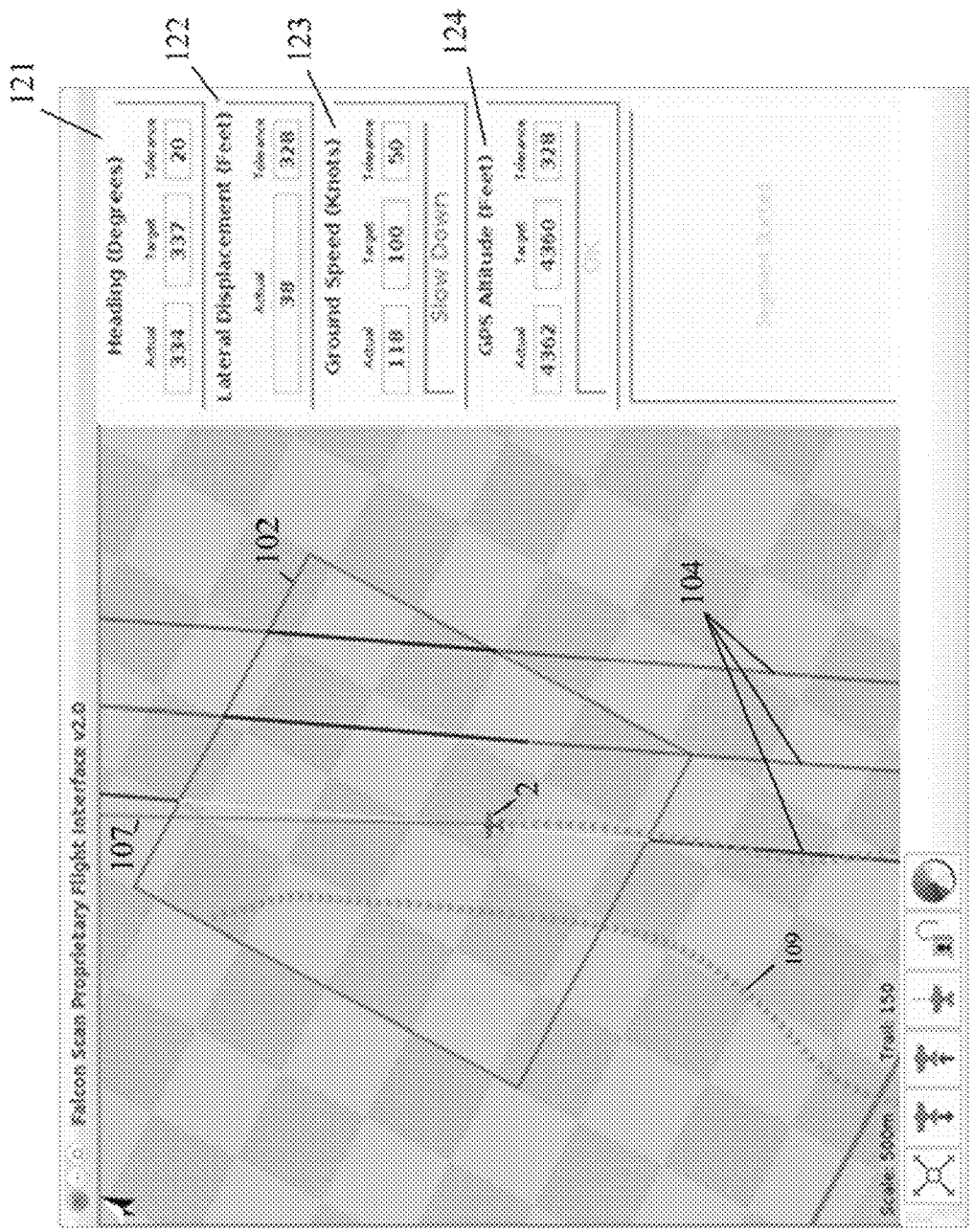
FIG. 3 shows a screen capture from the pilot interface display on the tablet PC in the cockpit.

FIG. 3 shows a screen capture from the pilot's interface display on the tablet PC 20 in the cockpit. The aircraft 2 is represented near the center of the display at the geographical site reported by the GPS receiver 40. Given the above-mentioned collect of an area of interest, the collection box is represented by a blue box 102 that circumscribes the collection area, and box 102 is plotted with several flight lines 104 ("rasters"). The rasters 104 are calculated and plotted in real time by the tablet PC 20. The spacing between rasters 104 is calculated in accordance with a predefined altitude so that all the ground between different rasters 104 will be photographed and that photos from adjacent rasters 104 will overlap. Importantly, the software automatically orients the rasters 104 so that the direction of flight is either towards or away from the sun at the time of the collect. A solar ephemeris inside the flight control software calculates the position of the sun in the sky using the position and time from the GPS 40. The tablet PC 20 determines the solar ephemeris using the time when the aircraft arrives in the vicinity of the collect, calculates the direction of flight toward and away from the sun, and automatically orients the rasters 104 in parallel paths of alternating direction. This helps to improve tile boundary continuity in the mosaics as there is generally a strong dependence on reflected light intensity according to whether sunlight is reflected towards the camera(s) 110, 112 in the forward-scatter or away from the camera(s) in the back-scatter geometry. In general, when flying towards or away from the sun, scattering differences will create a noticeable seam between pictures belonging to the same raster in a mosaic. However, decreasing the time between successive photos brings seams closer together, which diminishes the difference in scattering across each seam for a smoother transition.

The pilot interface display software tracks the aircraft 2 position. The current-heading line 107 is color-coded to indicate current heading and the checkerboard gives scale. The pilot interface display updates in real time using the latest GPS 40 information.

As the aircraft 2 flies along a raster 104, the camera(s) 110, 112 are repetitively triggered at the beginning of each GPS 40 cycle. Typically, the flight plan will require a photo every 1, 2, or 3 seconds in order to collect photos with significant overlap along the raster 104 and the avionics box 30 synchronizes the camera 110, 112 shutters to the GPS 40 signal, firing periodically but each time at the "top-of-the-second." Camera shutter triggering is automatically suppressed outside of the collection area 102, after which the pilot breaks off the flight line, turns around, and heads into the next raster 104. The pilot interface display software offers the pilot cues such as "true-heading" directional vector 107 for aligning the flight path with the intended raster 104, and numerical readouts including heading 121, lateral displacement 122, ground speed 123, and GPS altitude 124, all of which help to maintain proper heading, altitude and ground speed. Tracks actually flown are shown in serrated lines 109. If the pilot fails to fly a sufficiently precise flight path along a raster 104 (within predefined error tolerances) the pilot interface display software designates the raster 104 for reflight.

Photo Pre-processing and Cloud-Based Network Upload

The pilot, after landing the plane or UAV, subjects the collect including photos and flight log (with recorded shutter times and GPS positions of the aircraft during flight) to a multi-step process that begins with local pre-processing and upload to a cloud-based network, followed by a one or two-pass processing in the cloud-based network.

Local Pre-Processing and Setup

The cameras 110, 112 are equipped with Secure Digital (SD) cards, which are taken out of the cameras and inserted into a local PC computer to facilitate pre-processing and upload.

Figure 4:
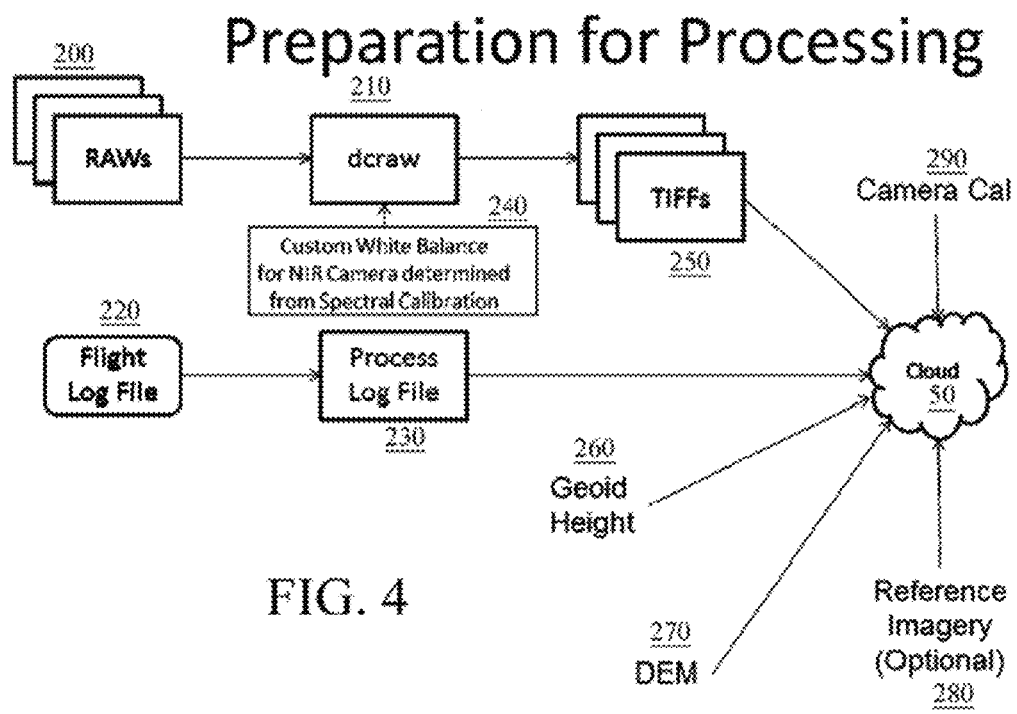
FIG. 4 is a block diagram illustrating the steps of photo pre-processing and cloud-based network upload according to the invention.

FIG. 4 is a block diagram illustrating the steps of photo pre-processing and cloud-based network upload. At step 200 the collected photos are transferred from the SD cards from cameras 110, 112 in uncompressed "RAW" format to a local computer. At step 210 the collected photos are processed into Tagged Image File Format (TIFF) format using an open source software program called dcraw. The conversion to TIFF may be done on a local computer or in the cloud. When the RAW files from the NIR camera 112 are processed to TIFF it is important, for agricultural applications, to apply a white balance calibration, the calibration parameters being specific to the particular camera used. The white balance calibration is applied at step 240. At the same time, at step 220, the flight log file (with recorded shutter times and GPS positions of the aircraft during flight) is input at step 230, to extract the GPS locations for the aircraft 2 and to construct a local reference frame for the aircraft at its location for each photo in which to orient the camera(s) 110, 112. The local reference frame is defined by the aircraft position and velocity vectors, which are respectively approximately parallel to the aircraft yaw and roll axes.

At step 250 the TIFF format photos are uploaded to the cloud computing network 50 if not already existing there.

At steps 260-280 necessary data from public sources is uploaded, including a Digital Elevation Model (DEM) for the area of interest at step 270, the height of geoid above the WGS 84 ellipsoid at step 260, and any reference imagery or survey markers at step 280. In addition, default camera calibration parameters specific to the camera-lens combinations in use by cameras 110, 112 are uploaded at step 290.

Figure 5:
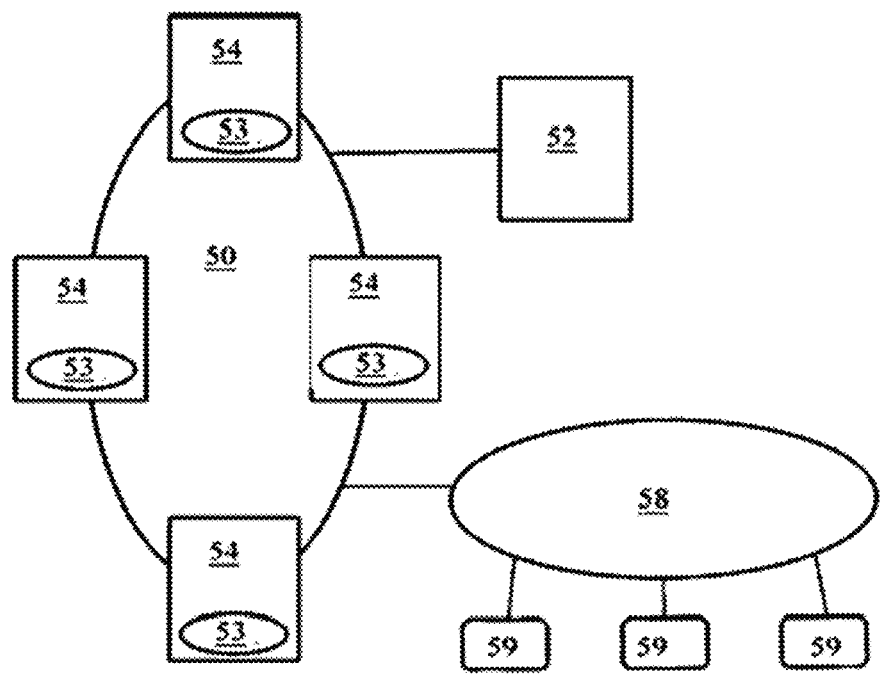
FIG. 5 illustrates the cloud computing network architecture of the present system.

FIG. 5 illustrates a suitable cloud computing network 50 with an attached cloud data store 52. Any number of cloud computing nodes 54 may be connected in the cloud computing network 50, each running cloud computing services 53 in accordance with the present invention. A local network 58 is in communication with the cloud computing network 50.

End users 59 in local network 58 access cloud-based applications 53 from their local computers through a web browser or a light-weight desktop or mobile application, using a standard I/O-devices such as a keyboard and a computer screen in order to upload all of the foregoing TIFF format photos, flight log, public source data and calibration data to the cloud computing network 50. Once uploaded, the collective data is subjected to a one or two-pass image registration process described below.

First Pass: Image Tie-Point Registration

Figure 6:
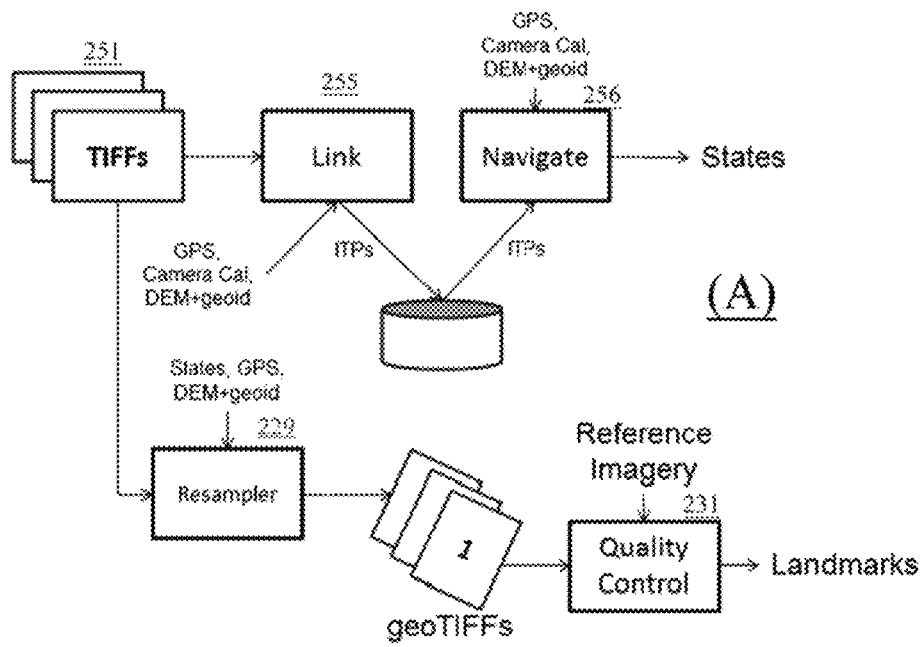
FIG. 6(A-B) is a flow chart illustrating the steps of the image registration process.
Figure 6:
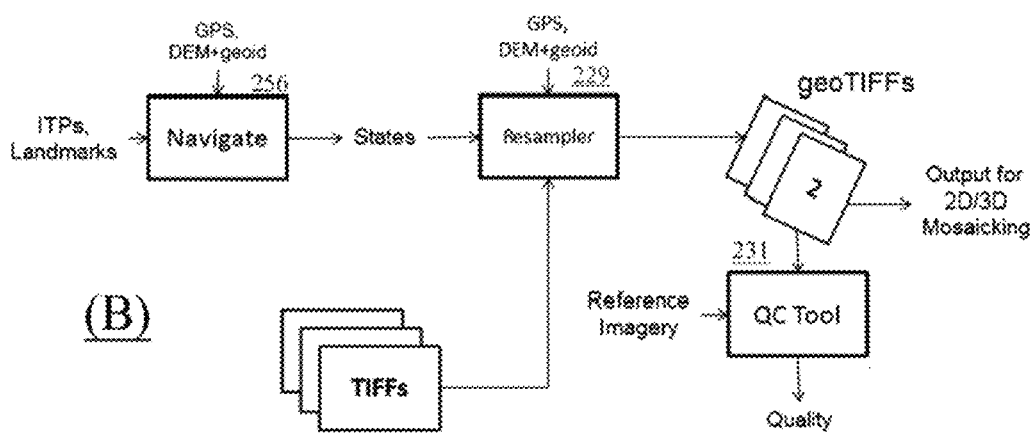

FIG. 6(A) is a flow chart illustrating the first-pass steps of the image registration process, beginning with the now-uploaded TIFF images at step 251. At step 255, the TIFF images are linked to create a large set of image tie-points (ITPs). One of the cloud-based applications 53 is an automated image tie-point registration module. ITP module 53 uses an automated tie-point process to do an approximate registration between pairs of photos. Image-to-image tie-point registration is well known and generally involves the identification of many image tie-points. The present approach works with image pairs. One image is designated as the "home frame" and small templates called "chips" are extracted from it. A match for each chip is searched for in the other photo (called the "target frame"). The present invention uses a novel "accelerated" multi-resolution matching method as described below. When a match is successful, we know that an object in the chip centered at a specific pixel location (row1, column1) within the home frame is found at (row2, column2) within the target frame. This correspondence between (row1, column1) and (row2, column2) is a tie point. Since the orientation between photo 1 and photo 2 can be arbitrary, the first photo is remapped ("pre-rectified") into the geometry of the second as the chips are extracted. Therefore, the chips are as they would appear were they acquired from the vantage point of the second photo. The linking of images 255 by tie points is highly parallelized within the cloud computing network 50.

Two problems arise with the foregoing approach. The first problem is that knowledge of all twelve states (three position and three orientation states per image) associated with each image pair is required for pre-rectification. The second problem is that image matching must face an added complication in that perspective changes from image-to-image. In each pair of images, three dimensional objects are being viewed on the ground from two distinct vantage points. This can make the appearance of the object change and compromise the ability of algorithms such as normalized cross correlation to find matches.

To overcome both problems, a multi-resolution matching method is used. The registration software module (resident on one or more computing nodes 54 of FIG. 5) loads the first and second images to be registered.

Figure 7:
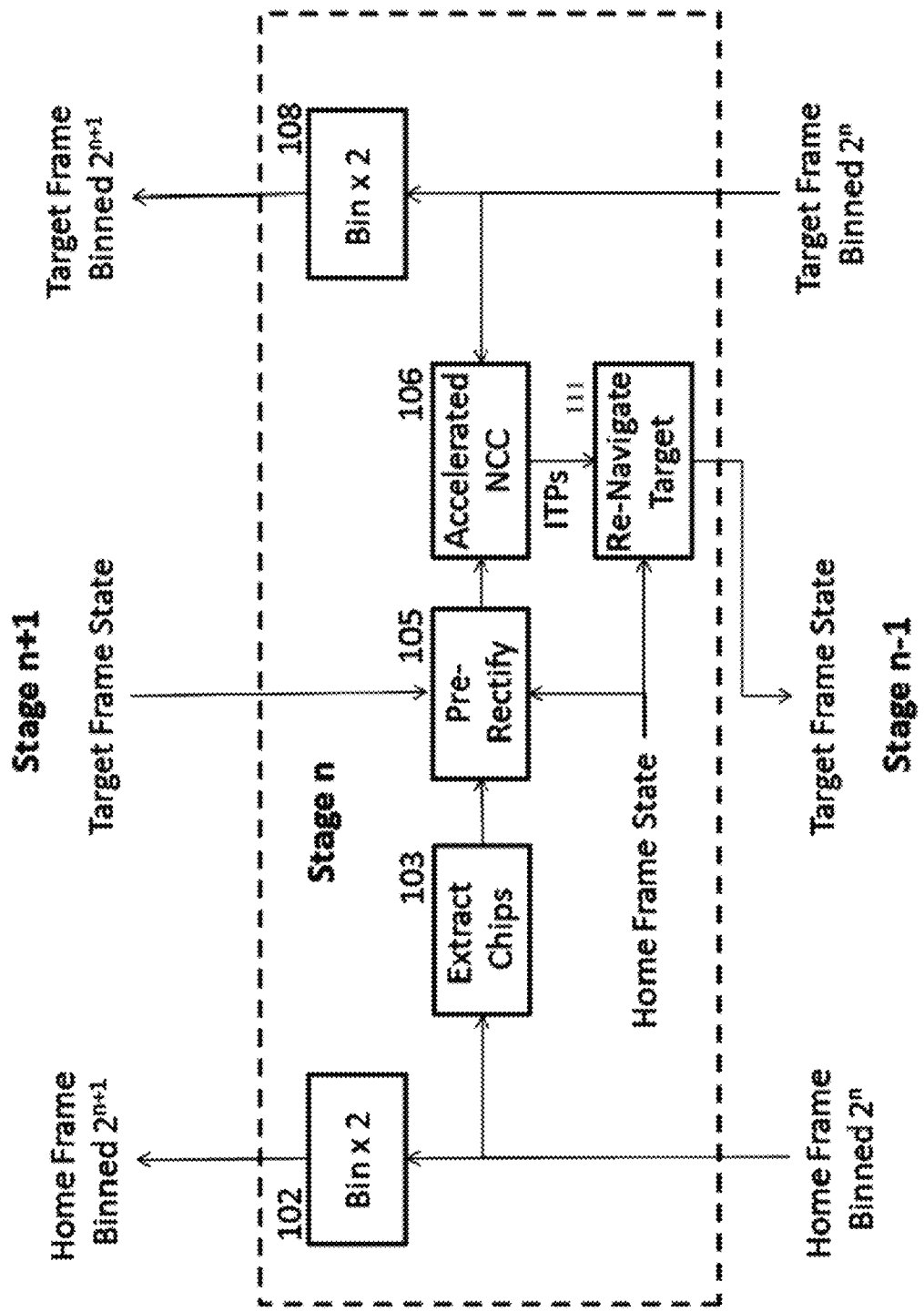
FIG. 7 illustrates the accelerated multi-resolution matching method of the present invention.

FIG. 7 is a detailed illustration of one stage of the present multi-resolution matching method. The stages are stacked with n=0 on the bottom, followed by n=1, and progressing up to a top stage. Stage n works with imagery with its resolution reduced by $2^n$ binning relative to the original image.

At left, the home frame is read into memory. At the right, the target frame is read in. At steps 102, 108 both are iteratively binned two fold, progressing stage-by-stage up to the top. The first iteration of matching starts at the top stage with a very low resolution, e.g., 32×32 binning, where arrays of 32×32 pixels have been binned into a single larger pixel, greatly reducing the overall number of pixels. This aggregation greatly reduces the processing time but degrades resolution. Chips are extracted from the home frame at step 103 on a regular grid and reprojected from the perspective of the home frame into the perspective of the target frame in a pre-rectification step 105 relying on the three position and three orientation states for each frame. An accelerated Normalized Cross-Correlation (NCC) algorithm 106 finds ITP matches for each chip in the target frame. When successful, the ITPs are saved and used to re-navigate the target frame at step 111, which allows for a more accurate pre-rectification in the stage below. Processing terminates at stage zero.

Figure 8:
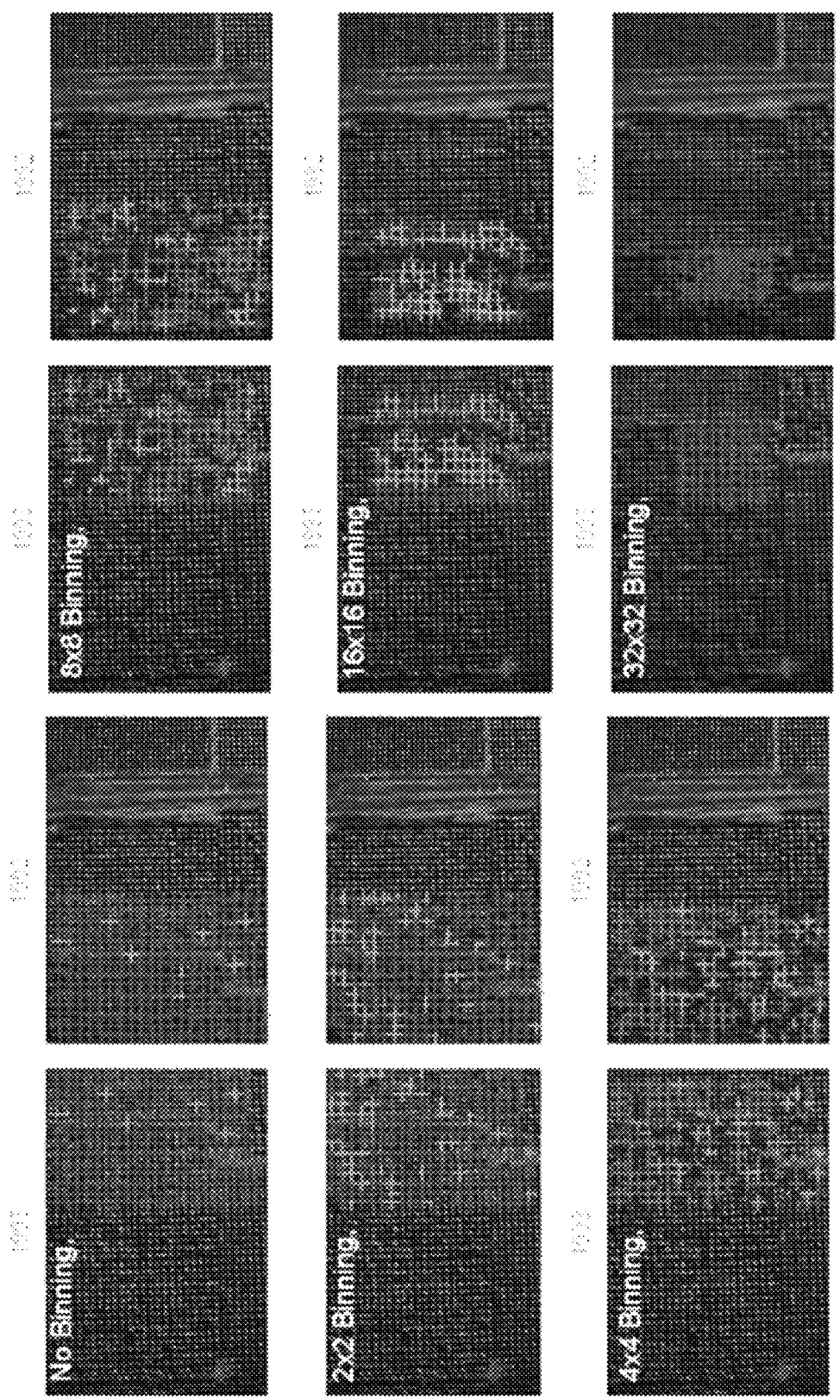
FIG. 8 shows the matching approach between frame pairs.

FIG. 8 pictorially illustrates how this works in practice over an orange grove in California. Matches between frame pairs (left and right, e.g., 1992 and 1993) are attempted at each site marked. The quality of the result is graded and color-coded, with the best indicated by purple, followed by blue, green and red. Higher quality purple and blue sites are considered adequate for navigation purposes, although a few matches may be cast out in statistical outlier editing during the navigation step 111. The starting resolution (bottom right) is that of 32×32 binning. At this scale, no matches are found in this illustration. Next, 16×16 binned-resolution is attempted (middle right). Best results are obtained at 8×8 and 4×4 binning. Perspective change between pictures interferes with effective matching at 2×2 and 1×1 binning in this illustration.

The NCC algorithm first normalizes the chip template $T(x, y)$ by subtracting its mean and dividing by its standard deviation, so that the result $\hat{T}(x, y)$ has zero mean and unit variance. The normalized cross-correlation for the chip over the image $I(x, y)$ is ordinarily calculated at all possible shifts $(u, v)$ according to the formula:

$$C(u, v) = \frac{\sum_{x,y} (I(u+x, v+y) - \bar{I}_{u,v})\hat{T}(x, y)}{\sqrt{\sum_{x,y} (I(u+x, v+y) - \bar{I}_{u,v})^2}}.$$

In the formula, the notation $\bar{I}_{u,v}$ is the mean value of the image pixels underneath the chip when offset by $(u, v)$.

Acceleration of the NCC algorithm is accomplished by first sorting the $\hat{T}(x, y)$ in descending order by absolute value. Those that are early in the sorted list are the most important contributors in the formula. At each $(u, v)$, a partial calculation is made with a subset of the sorted list to predict the value of the full precision calculation. In almost all cases, the predicted value of $C(u, v)$ will be small and it is not worth completing the calculation to full precision; however, when the prediction is large, the calculation is completed to full precision.

Figure 9:
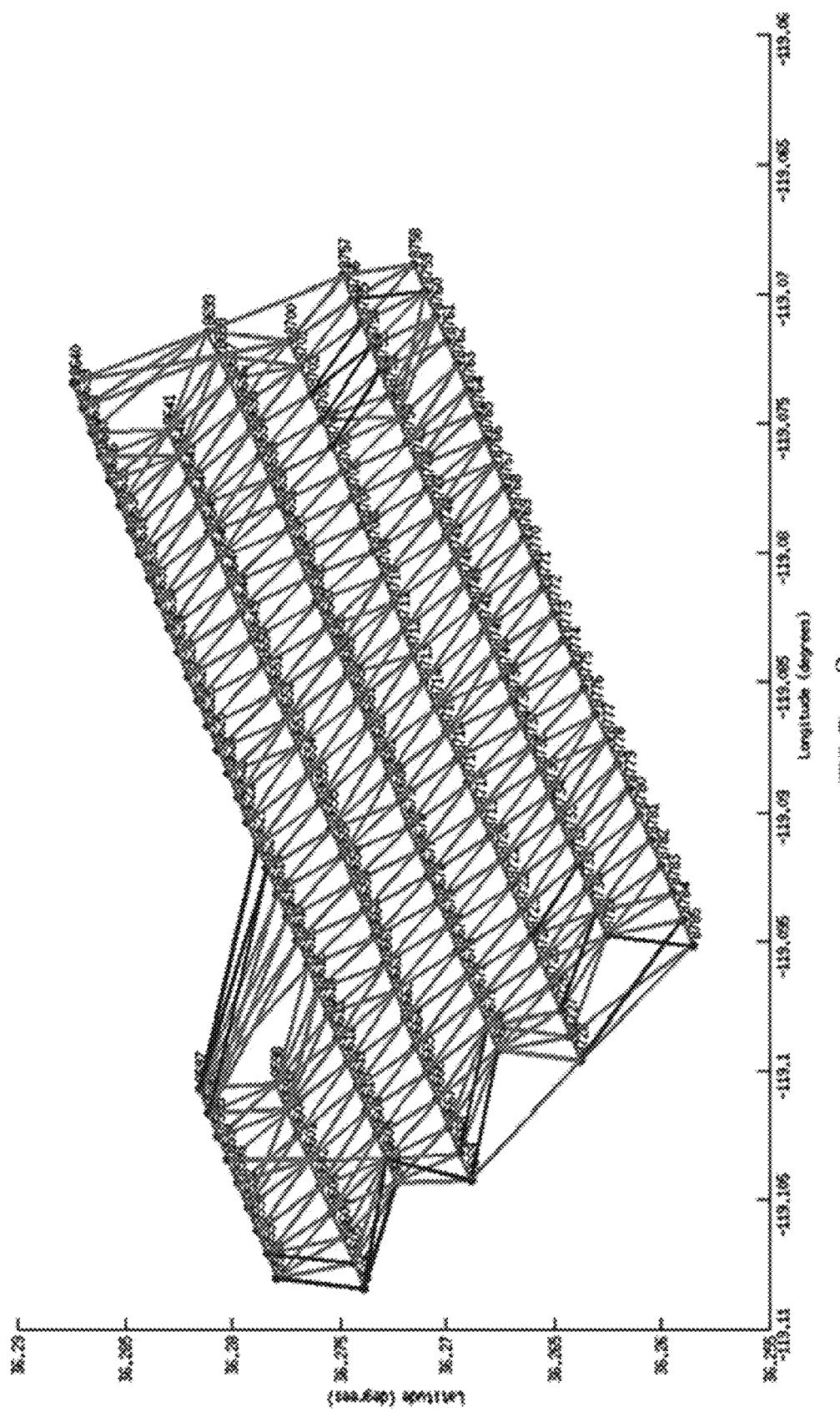
FIG. 9 is a graphical illustration of a tie-point registration map.

All successfully matched ITPs are collected from all the stages of the multi-resolution matching process for all frames linked by tie points. FIG. 9 shows a practical illustration with eight rasters. The GPS location for the aircraft at each frame is plotted next to a frame number. Purple links indicate that a large number of ITPs were found and blue links indicate that an adequate number were found. The entire collection of ITPs are input into a navigation process 256, which estimates a set of six states for each frame plus common states to represent the camera calibration (focal length and optical distortion).

Figure 10:
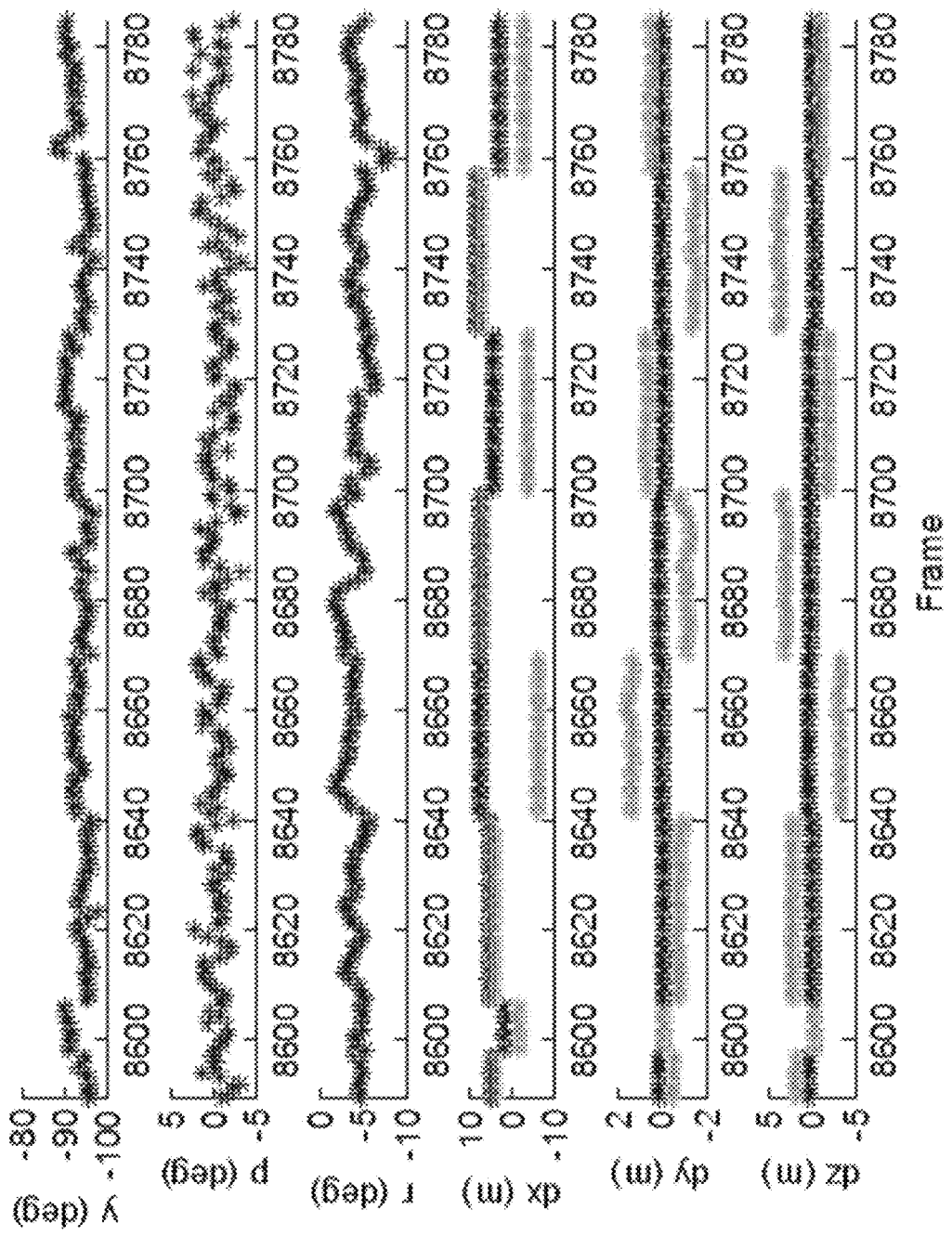
FIG. 10 is a plot of a set of state solutions.

FIG. 10 plots a typical set of state solutions. State estimation uses a conventional nonlinear weighted least squares estimation method so the states solved for are the optimal ones to describe the complete set of ITP measurements. Roll (r), pitch (p), and yaw (y) states orient the camera. Position states represent corrections to the GPS along the x-axis (direction of flight), y-axis (along wing), and z-axis (vertical) of the local reference frame. Not shown are the camera calibration states for one camera. Green symbols are in an earth fixed frame, whereas blue symbols are in the local reference frame for each state. Individual ITP measurements are more heavily weighted in the least squares estimation if made at a finer resolution. ITPs are also two-dimensional measurements, so that the direction parallel to the baseline between the two aircraft positions can be down-weighted relative to the orthogonal direction, which is beneficial because this direction along the baseline is affected by parallax.

At step 229 each uploaded image is ortho-rectified to a map projection (e.g., UTM) in accord with the state solution. An orthorectified image is one that has been geometrically corrected ("orthorectified") such that the scale of the photograph is uniform, meaning that the photograph can be considered equivalent to a map. Every pixel of an orthorectified image of the earth corresponds to a view of the earth surface seen along a line perpendicular to the earth. An orthorectified image also comprises metadata referencing any pixel of the orthorectified image to a point in the geographic coordinate reference system.

Each remapped frame is prepared as a geoTIFF (TIFF file extended to include geographic referencing metadata tags). The georegistration of the collect can be checked in step 231 by comparing the locations of fixed landmarks seen in reference imagery or positions of aerial surveying targets versus their locations seen in the geoTIFFs.

Second Pass: Image Tie-Point Registration

Deviations in geo-registration of landmarks, if deemed too large, can be corrected in an optional second pass as shown in FIG. 6(B). The landmark measurements from the quality control step 231 are added as ITPs between the reference imagery and the image frames containing the landmarks. The navigation step 256 and remapping step 230 are repeated and georegistration quality is re-verified in step 231.

Figure 11:
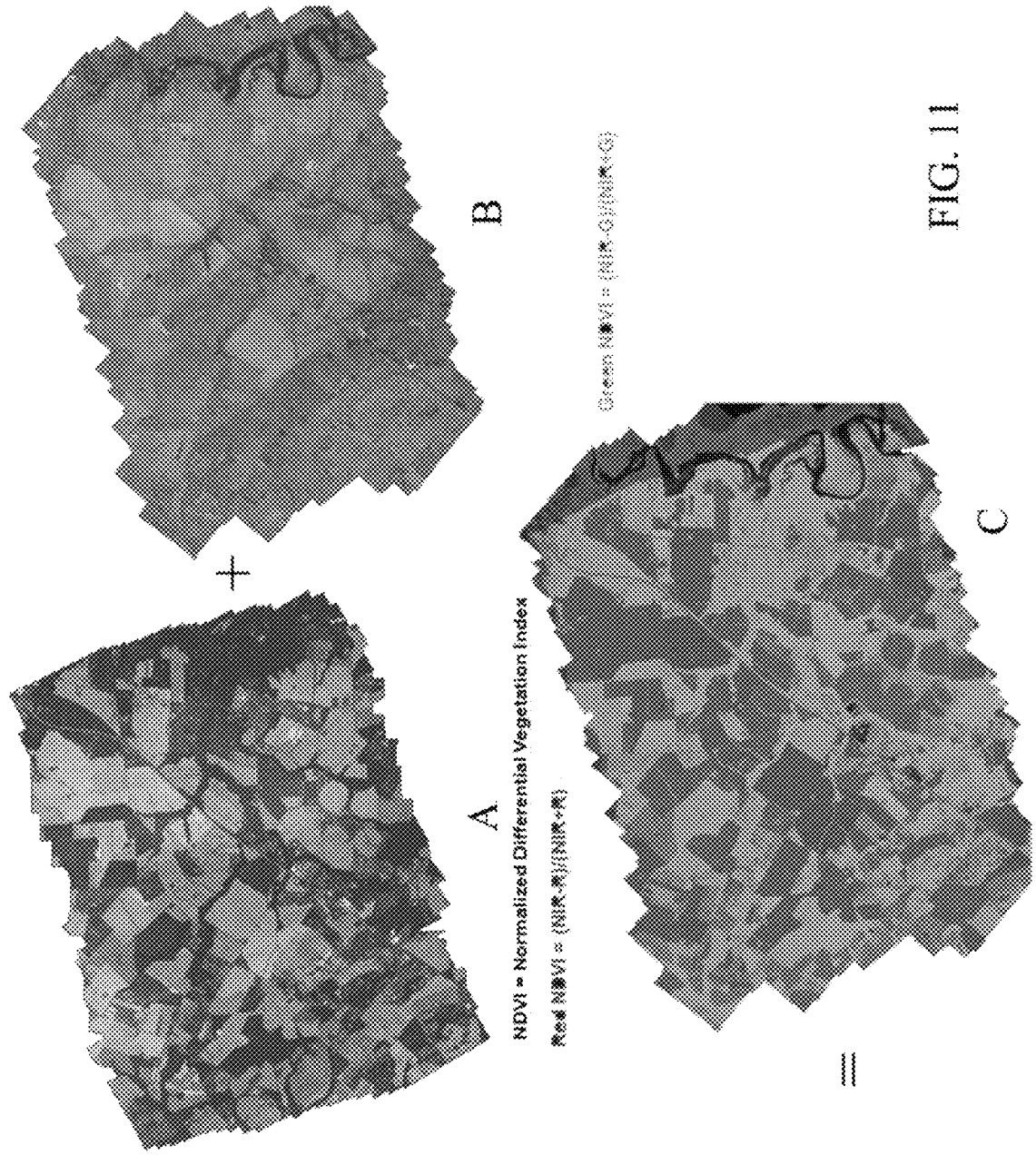
FIG. 11(A) is a sample mosaic from camera 110.
FIG. 11(B) is the same mosaic from NIR camera 112, and FIG. 11(C) combines (A and B) into Normalized Differential Vegetation Index (NDVI) maps.

The remapped photos cover the entire collect with great redundancy (i.e., significant overlap between photos so that the same point on the ground is covered multiply). Thus, a single pixel can be chosen from each image pair to represent each point on the ground, or alternatively, mosaic pixel values can be blended from two or more pixels. Either way, the process will create a single two-dimensional mosaic as shown in FIG. 11(A & B). FIG. 11(A) is a sample mosaic from camera 110, while sample 11(B) is from NIR camera 112.

Stereotactic Mosaicking

Note that renderings 11(A, B) lose their 3D information. In order to restore 3D, the present process rasterizes the two remapped photos and determines the overlaps between successive ones. Overlapping pairs of successive images (stereo pairs) are rendered for the left and right eye using 3D enabled graphical display technology to present the user with a 3D mosaic. The parallax between stereo pairs gives the height above the Digital Elevation Model used in remapping. We can measure heights of objects from this residual parallax.

Vegetation Indices

Either 2D or 3D mosaics can be converted into Normalized Differential Vegetation Index (NDVI) products, as seen in FIG. 11(C). NDVI is a measure of plant cover and plant health. A green NDVI is possible with a one-camera payload as follows:

$$GREEN\ NDVI=(NIR-GREEN)/(NIR+GREEN)$$

e.g., the difference between the NIR and green responses divided by their sum.

A red NDVI is possible with the two-camera payload as the difference between red and green divided by their sum.

$$RED\ NDVI=(NIR-RED)/(NIR+RED)$$

FIG. 11(C) shows both Red NDVI (red) and Green NDVI (green) overlaid.

It should now be apparent that the above-described system provides a turnkey solution for collecting and processing aerial imagery at far lower cost and reduced computer overhead, allowing geolocation of each pixel to high accuracy and generating uniquely processed 3D NIR imagery for diagnosis of plant health. Deployed as a cloud-based Software as a Service (SaaS) the system allows UAV and manned aircraft pilots to upload and manage their image processing through a web based interface.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A system for collection and processing aerial imagery collected from an aerial vehicle, comprising:
   at least one camera;
   an avionics box comprising a microprocessor;
   a GPS receiver;
   a remote computing device in said aerial vehicle and a software application comprising instructions executable by said remote computing device for guidance along a raster flight plan across a predetermined geographic area and automatically triggering said at least one camera to collect overlapping images based on coordinates of said GPS receiver; and
   a computing cloud comprising a plurality of cloud computing nodes, at least one data storage device and at least one processing device running at least one software application, wherein said at least one software application further comprises,
      computer instructions stored on said data storage device and executable by said at least one processing device that locate image tie points as between two or more images via an iterative multi-resolution matching method in which image tie points between said plural images are repetitively cross-correlated in iterations of increasingly finer resolution and stored at said data storage device until all said image tie points at all said resolutions are identified and stored at said data storage device, and
      computer instructions stored on said data storage device and executable by said at least one processing device for state estimation of said at least one camera orientation and GPS receiver error from said stored image tie points, for orthorectification of said two or more images for perspective and relief error by association of at least one pixel in each of said two or more images with a point in a geographic coordinate reference system, and for accurately mapping said corrected two or more images to a map projection.

2. The system of claim 1, wherein said at least one camera comprises two consumer market digital single lens reflex cameras.

3. The system of claim 1, wherein at least one of said at least one cameras is modified for acquisition of Near-Infrared imagery.

4. The system of claim 1, wherein said remote computing device further comprises a pilot interface displaying pilot guidance imagery pertaining to a predetermined flight path.

5. The system of claim 4, wherein said predetermined flight path comprises a plurality of rasters oriented towards or away from the sun and covering a predetermined geographic area.

6. The system of claim 5, wherein said remote computing device is mounted in an aircraft, and wherein said pilot interface comprises a display showing the position of said aircraft relative to said rasters.

7. The system of claim 5, wherein said remote computing device further comprises a solar ephemeris.

8. The system of claim 1, wherein said avionics box further comprises a triggering system coupled to said at least one camera.

9. The system of claim 8, wherein said avionics box is in cooperative communication with said GPS receiver, wherein said avionics box further comprises a counter that increments with each one of a plurality of GPS top-of-second pulses, and wherein said counter is in cooperative communication with said triggering mechanism.

10. The system of claim 9, further comprising a digital connection between said avionics box and said remote computing device for transmission of command dialog from said remote computing device to said avionics box and for transmission and storage of GPS location data from said GPS device.

11. The system of claim 1, wherein said at least one camera, said avionics box, said GPS receiver and said remote computing device are mounted in an aircraft.

12. In a system comprising a cloud computing system comprising a plurality of cloud computing nodes, at least one data storage device and at least one processing device, said cloud computing system being connected via a communications network to at least one remote computer workstation, and a portable computing device coupled with at least one imaging device and at least one GPS receiver, a method for collecting and processing aerial images captured along one or more flight paths over a target geographic area comprising the steps of:
   collecting, by said remote computer workstation, a plurality of GPS data elements pertaining to said flight path from said portable computing device, and a plurality of said images from said at least one imaging device, wherein each one of said plurality of images is associated with at least one of said plurality of GPS data elements;
   applying, by at least one of said plurality of cloud computing nodes, an iterative multiresolution linking process to said plurality of images whereby image tie points between two or more of said plurality of images are identified in iterations of increasingly finer resolution while refining an estimated position and orientation of said at least one imaging device until all said image tie points at all said resolutions are identified and stored, said multiresolution linking process further comprising,
- applying a navigation process to said plurality of images whereby estimated position and orientation inclusive of a first roll, pitch, yaw, and absolute three-dimensional location of said imaging device in the geographic coordinate reference system is determined with respect to each one of said plurality of images, and
- selecting, from said plurality of images, a home frame image and a target frame image,
- binning said home frame and said target frame;
- extracting one or more chips from said binned home frame image, each extracted chip comprising a grouping of adjacent pixels;
- identifying image tie point matches between each of said extracted chips relative to said binned target frame image; and
- iteratively, repeating said binning, extracting and tie-point identification substeps, binning less on each iteration and saving the image tie point matches at each iteration for subsequent use;

applying, by at least one of said plurality of cloud computing nodes, an orthorectification process to each one of said plurality of images, whereby each one of said plurality of images is assigned a geographic referencing metadata tag indicating the association between at least one pixel in each of said plurality of images with a point in the geographic coordinate reference system.

13. The method of claim 12, further comprising a mapping step comprising the substeps of,
- determining, by said portable computing device, the position of the sun in the sky;
- calculating, by said portable computing device, the direction of flight towards and away from the sun; and
- determining, by said portable computing device, in real-time a plurality of parallel rasters of alternating direction along said direction of flight towards and away from the sun and covering said target geographic area;
- wherein two or more of said plurality of rasters collectively comprise one of said one or more flight paths.

14. The method of claim 13, further comprising, after said step of mapping, guiding, by said portable computing device, the flight of an aircraft containing said at least one portable computing device and said at least one imaging device along at least one of said one or more flight paths.

15. The method of claim 14, further comprising the steps of
- requesting, by said remote computing device, a user input for an amount of time between images; and
- transmitting, by said remote computing device, said user input to an avionics box on said aircraft, wherein said user input directs said avionics box to trigger at least one of said imaging devices at a GPS top-of-second based on said user input when said aircraft is above said target geographic area.

16. The method of claim 15, wherein said step of collecting further comprises the step of importing, by said portable computing device, said plurality of GPS data elements into flight planning software running on said portable computing device.

17. The method of claim 12, further comprising, after the step of collecting, uploading, via said remote computer workstation, said plurality of GPS data elements and said plurality of images to said cloud computing system.

18. The method of claim 17, further comprising, after said step of collecting, uploading, via said remote computer workstation, public reference imagery relating to said target geographic area to said cloud computing device.

19. The method of claim 18, wherein said multiresolution linking process further comprises, in one of said plurality of cloud computing nodes,
- selecting, from said plurality of images, a home frame image and a target frame image;
- binning said home frame and said target frame by combining arrays of pixels in said frames to reduce the number of pixels by a predetermined factor;
- extracting one or more chips from said home frame, wherein each of said chips comprises one or more adjacent pixels;
- reprojecting said one or more chips into the perspective of said target frame;
- applying an accelerated Normalized Cross-Correlation algorithm to each of said one or more chips relative to said target frame to locate any successful image tie point matches;
- saving said successful image tie point matches to said at least one data storage device;
- re-binning said home frame and said target frame to increase the number of pixels in said frames by a predetermined factor;
- using said successful image tie point matches to re-navigate said re-binned target frame; and
- repeating said selecting, binning, extracting, reprojecting, applying, saving, re-binning, and using steps for a predetermined number of iterations.

20. he method of claim 12, further comprising, comparing, by one of said plurality of cloud computing nodes, the locations of fixed landmarks seen in reference imagery with locations of said fixed landmarks as they appear in said plurality of images.

21. The method of claim 20, further comprising, in one of said plurality of cloud computing nodes, repeating said steps of applying a navigation process and applying an orthorectification process, wherein the locations of said fixed landmarks are used as inputs for said step of applying a navigation process.

22. The method of claim 12, further comprising, in one of said plurality of cloud computing nodes, rendering two successive overlapping images from said plurality of images to create a 3D mosaic of said target geographic area.

23. The method of claim 22, further comprising using said 3D mosaic to measure the heights of objects in said target geographic area.

24. The method of claim 22, further comprising converting said 3D mosaic to a Normalized Differential Vegetation Index for diagnosis of plant health.

25. The method of claim 12, further comprising applying a Normalized Differential Vegetation Index to said plurality of images for diagnosis of plant health.

26. A cloud-based system for collecting, processing and distributing aerial imagery, comprising:
- a first cloud computing node connected in the cloud computing network comprising a processor and a computer readable medium storing a user software application accessible by any number of remote computers, said user software application comprising computer-executable instructions for uploading a plurality of aerial image photos and a corresponding flight log and calibration data from said remote computer(s) to the cloud computing network, and a second cloud computing node connected in the cloud computing network comprising a processor and a computer readable medium storing a cloud-based application comprising computer-executable instructions for carrying out the steps of, successively performing at a plurality of different binned resolutions first-pass of an image tie point registration to determine image tie-point matches between successive pairs of said uploaded aerial image photos, and storing all identified image tie points at all said resolutions at said second cloud computing node, performing between each successive first-pass image tie point registration a state solution estimation by applying a least squares estimation method to estimate camera roll (r), pitch (p), and yaw (y) states for said uploaded aerial image photos, GPS corrections along three axes (x, y, z), and camera calibration states and utilizing said state solution estimation in a successive first-pass image tie point registration, ortho-rectifying each of said uploaded aerial image photos to a map projection in accordance with said estimated state solution, and displaying said orthorectified map projection to one of said remote users.

27. The cloud-based system according to claim 26, wherein said cloud-based application further comprises computer-executable instructions for carrying out the step of performing a second-pass of an image tie point registration by the steps of, determining deviations in geo-registration of reference imagery from said ortho-rectified uploaded aerial image photos, correcting said deviations in geo-registration of reference imagery, and remapping said map projection in accordance with said corrected reference imagery.

* * * * *